(No Model.)
C. F. HALDEMAN.
TONGUE SUPPORT.
No. 451,480. Patented May 5, 1891.
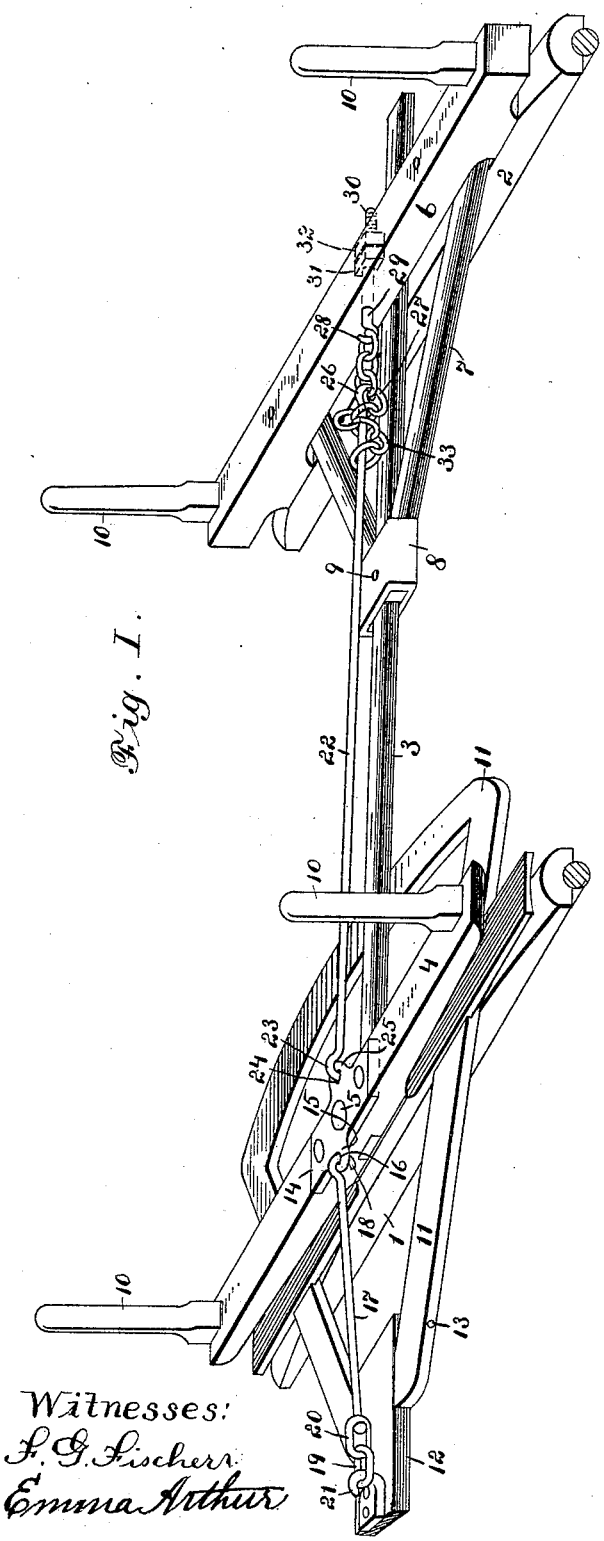
Fig. I.
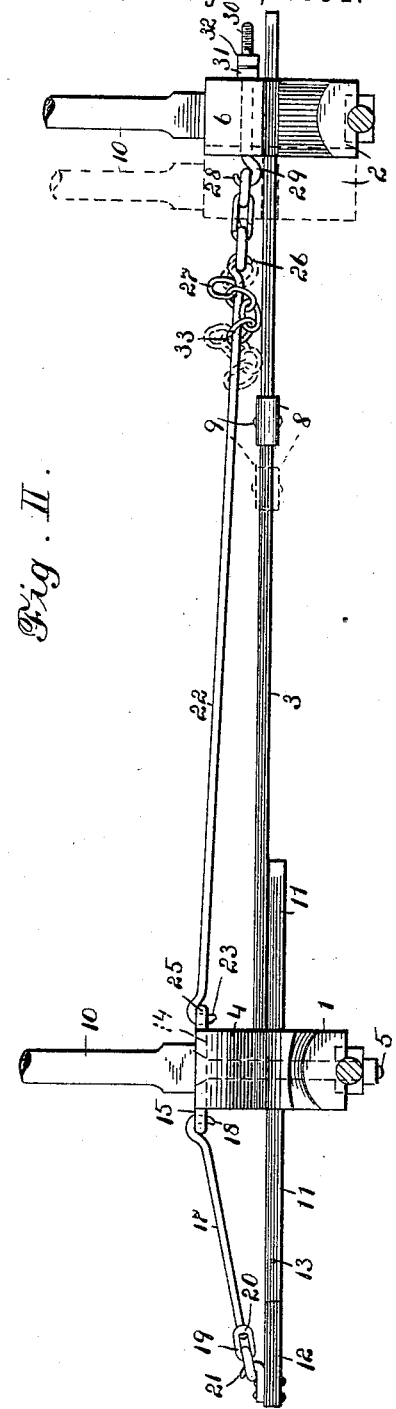
Fig. II.
Witnesses:
F. G. Fischer
Emma Arthur
Inventor
C. F. Haldeman
By Knight Bros.
Attys.

UNITED STATES PATENT OFFICE.

CHARLES F. HALDEMAN, OF KANSAS CITY, MISSOURI, ASSIGNOR OF ONE-HALF TO WILLIAM O. THOMAS, OF SAME PLACE.

TONGUE-SUPPORT.

SPECIFICATION forming part of Letters Patent No. 451,480, dated May 5, 1891.

Application filed August 12, 1890. Serial No. 361,837. (No model.)

*To all whom it may concern:*

Be it known that I, CHARLES F. HALDEMAN, of Kansas City, in the county of Jackson and State of Missouri, have invented certain new and useful Improvements in Tongue-Supports, of which the following is a full, clear, and exact description, reference being had to the accompanying drawings, forming a part of this specification.

My invention relates to an improved device for supporting vehicle-tongues; and my invention consists in features of novelty hereinafter described, and pointed out in the claims.

Figure I is a perspective of my improved device. Fig. II is a side elevation.

Referring to the drawings, 1 represents the front axle, and 2 the rear axle, of an ordinary wagon.

3 represents the reach by which the axles are coupled to each other.

4 represents the front bolster, which is connected to the front axle by means of the ordinary king-bolt 5, said king-bolt passing through the front bolster, through the forward end of the reach, and through the front axle.

6 represents the rear bolster, and 7 the rear hounds.

8 represents a hollow head, to which the forward ends of the rear hounds are attached and through which the reach passes. A bolt 9, passing through said head and through holes in the reach, makes an adjustable connection between the hounds and the reach, whereby the vehicle may be either lengthened out or shortened up at will.

10 represents the standards on the bolsters for the purpose of holding the box or bed of the vehicle in position.

11 represents the front hounds, which are secured to the front axle.

12 represents the tongue, which is pivoted to the forward end of the front hounds by a bolt 13.

14 represents a plate countersunk into the front bolster and through which the king-bolt 5 passes.

15 represents a lug on the front side of the plate 14, through which there is an opening 16.

17 represents a rod having a hook 18 on one of its ends, which hooks into the opening 16 in the lug 15. The opposite end of the rod 17 is secured to links 19 by a swivel connection, as shown at 20. One of the links 19 may be placed over a hook 21 on the tongue, and thus hold the tongue up level with the hounds, in order to prevent the weight of the same from coming on the necks of the team. If it is desired at any time to lower the forward end of the tongue, all that is necessary to do is to raise the tongue slightly, disengage the link 19 from the hook 21, and then lower the tongue.

In order to avoid the weight of the tongue from canting the front bolster, I provide a rod 22, having a hook 23, which engages in an opening 24 in a lug 25 on the plate 14, the opposite end of said rod having a hook 26. 27 represents a chain connecting the hook 26 with a hook 28 on one end of a bolt 29. The bolt 29 passes through the rear bolster and is screw-threaded, as shown at 30. 31 represents a nut and 32 a jam-nut on said bolt, by which means any slack in the chain 27 may be taken up. When it is desired to lengthen out the vehicle, the chain 27 can be adjusted on the hooks 26 28, any number of links required being used, the surplus links being threaded on the rod 22, as shown at 33, when not in use, from which position they can be readily slipped off when it is desired to use them.

By the use of my device the front bolster is at all times held in its proper position, as well as supporting the tongue.

I claim as my invention—

1. In a tongue-supporter, the combination of a pivoted tongue, hook 21 on the tongue, front bolster 4, plate 14, secured to said bolster, rod 17, and links 19, connecting the plate 14 with the hook 21, rear bolster 6, bolt 29, secured to the rear bolster, and a rod 22 and chain 27, forming a connection between the plate 14 and the bolt 29, substantially as described, and for the purpose set forth.

2. In a tongue-supporter, the combination of the tongue 12, front bolster 4, means for connecting said bolster with the tongue, rod 22, connected at its front end with said bolster, hook 26 on said rod, rear bolster 6, adjustable bolt 29, secured to the rear bolster, hook 28 on said bolt, and chain 27 for adjustably connecting the hook 28 with the hook 26, the slack portion of said chain being threaded on the rod 22, substantially as described, and for the purpose set forth.

CHARLES F. HALDEMAN.

Witnesses:
JAS. E. KNIGHT,
M. G. DEWEY.